(12) United States Patent
Exler et al.

(10) Patent No.: US 7,721,663 B2
(45) Date of Patent: May 25, 2010

(54) SEEDING APPARATUS

(75) Inventors: Selwyn Vesey Stewart Exler, Auckland (NZ); Michael Kevin Scheib, Auckland (NZ)

(73) Assignee: Exler Equipment Limited, Auckland (NZ)

( * ) Notice: Subject to any disclaimer, the term of this patent is extended or adjusted under 35 U.S.C. 154(b) by 0 days.

(21) Appl. No.: 12/216,913

(22) Filed: Jul. 11, 2008

(65) Prior Publication Data
US 2009/0151611 A1 Jun. 18, 2009

Related U.S. Application Data

(63) Continuation of application No. 10/562,153, filed as application No. PCT/NZ2004/000129 on Jun. 23, 2004, now abandoned.

(30) Foreign Application Priority Data

Jun. 23, 2003 (NZ) .................................. 526665

(51) Int. Cl.
*A01C 5/00* (2006.01)
*A01C 7/00* (2006.01)
*A01C 9/00* (2006.01)

(52) U.S. Cl. .................. 111/164; 111/168; 111/170
(58) Field of Classification Search ................. 111/140, 111/157, 163–169, 191–196, 121, 122, 170, 111/174, 175
See application file for complete search history.

(56) References Cited

U.S. PATENT DOCUMENTS 4,117,788 A * 10/1978 Whitehead .................. 111/158

FOREIGN PATENT DOCUMENTS

| AU | 586463 | 7/1989 |
|---|---|---|
| DE | 3324464 A1 | 1/1985 |
| EP | 0546974 A1 | 6/1993 |
| WO | WO91/05458 | 5/1991 |

* cited by examiner

*Primary Examiner*—Christopher J. Novosad
(74) *Attorney, Agent, or Firm*—Jacobson Holman PLLC

(57) ABSTRACT

A seed drill or seeder of a kind to deposit serial streams of seed each into a disc made trough, trench or the like, characterised by each disc having its bearing mounted to the disc from the inside (i.e. the concave side) and a chute providing member or assembly down which the stream of seeds is to passes, is attached to the bearing from the outside (i.e. the convex side) of the disc.

4 Claims, 11 Drawing Sheets

US 7,721,663 B2

SEEDING APPARATUS

This application is a Continuation Application of U.S. patent application Ser. No. 10/562,153 filed Jun. 13, 2006, now abandoned which is a nationalization of PCT/NZ04/000129 filed Jun. 23, 2004 and published in English which now claims priority to NZ 526665 filed Jun. 23, 2003

This is a nationalization of PCT/NZ04/000129 filed Jun. 23, 2004 and published in English.

TECHNICAL FIELD

The present invention relates to seed drills (sometimes referred to as "seeders") and features thereof and related methods, uses and assemblies. More particularly the invention is directed to a close centre seed drill and aspects thereof.

BACKGROUND ART

Many forms of seed drill are known.

Most involve a seed storage hopper and conduits therefrom whereby seeds are serially produced down to a seed deposition assembly usually associated with a ground trenching or cutting feature, (e.g. usually a plough or disc form) which is followed by a ground closing feature (e.g. a roller).

DISCLOSURE OF INVENTION

The present invention recognises an advantage in sowing of seed, for example, to produce turf, in ensuring the closest possible seed line to seed line distance for each transverse array or row. By "transverse array or row" is meant any substantially transverse arrangement of seed depositors irrespective of whether or not in part inclined to the true transverse direction, i.e. frequently it is common with such seeders to have two groups each angled differently but mirror imaged so as to ensure no resultant pull to one side or the other of the while apparatus.

In order to achieve such closeness of seed deposition assemblies to each other in each such substantially transverse array or row, we have recognised an advantage in associating the bearing or other hub forming component to a disc [usually of pressed plate material whether of strictly circular form or other so called "disc" form (e.g.; having peripheral scallops so as to define fingers)] from that side having some degree of concavity. This advantage manifests itself in enabling a mount to be associated to the bearing or hub from the other side (usually with some degree of convexity) thereby allowing that mount to provide at least in part or to carry a seed lowering chute, conduit or the like. Such a mount can be kept in close conformity to the convexity of the disc.

Such an arrangement of a mount attaching only into the bearing or hub of the disc, itself attached from the side of concavity (e.g. the "inside"), still can allow without interference in the seed passage a measure of controlled articulation of the mount relative to a trailing region of a swing arm thereby allowing adjustments (if there is an adjustment mechanism) of disc angle relative to the swing arm and the advance direction to be made.

The present invention also recognises an advantage to be derived where multiple seed deposition assemblies are appropriately supported from a towable or other advancable apparatus whereby (in preferably two rows) the seed deposition assemblies of one row being staggered with respect to the others so as collectively to provide transversely of the advance direction a greater closeness of rows of sown seed.

In another aspect the present invention consists in, as part of or for a seeder (i.e. apparatus capable of being advanced by drawing, self propulsion, carriage, pushing or otherwise) so as to lay multiple rows of sown seed into the ground in a single pass, a seed deposition assembly which comprises or includes a disc having one side with at least some degree on concavity, a hub or bearing ("hub") of or attaching to the disc at least primarily from the disc side with at least some degree of concavity, and at least one of
(i) a mount for the disc attaching to the hub from the other disc side so as to allow rotation relative to the mount
(ii) a swinging arm associated directly or indirectly with the hub from the other disc side so as to allow the raising and lowering of the disc rotational axis at least in part defined by the hub,
(iii) a moulding or other member at least in part defining a seed deposition chute, said moulding or other member attaching to said hub from the other disc side (i.e. to that of the concavity), and
(iv) a mount for the disc attaching to the hub from the other disc side as in (i), said mount being carried by a swinging arm.

Reference herein to "attaching", "attached" can be without or with other members to provide the appropriate engagements, e.g.; a nut and bolt to be applied from each disc side to hold the mount (as an assembly or member to the hub or bearing).

As used herein the term "disc" has any form appropriate for its use in rotation about a substantially central rotational axis so as to provide a troughing or other trench or the like forming effect in the ground as it is advanced (usually dragged usually under some ground directed flexible or other bias but not necessarily so).

Such discs as are used are preferably formed by pressing or other procedure from a sheet or substantially sheet material and therefore the "concavity" referred to is any offsetting sheet plane by the periphery and/or the centre or any variant which provides some degree of bowling.

As used herein "and/or" means "and" or "or", or where the context allows, both.

As used herein the terms "(s)" following a noun means as the circumstances allow or envisage the singular and/or plural of that noun.

As used herein the term "hub or bearing" refers to a hub to which a mount can rotatably affix from the other side and may constitute a ball or roller bearing assembly or any other form of bearing or part bearing member or assembly capable of being affixed (e.g.; by fasteners or the like to the disc) so that its greatest dimension out of the disc at its region of association therewith is preferably largely in the concave zone.

As used herein "inside" and/or "outside" in respect to the disc refers to the disc's concave/convex or bowled in/bowled out sides and not the relationship with the overall seed drill.

As used herein the term "swinging arm" or any variant thereof refers to any arm whether straight, kinked or otherwise akin to that of a swinging arm well known to motorcyclists, i.e. is preferably pivoted substantially horizontally at an in advance region or extremity and associates pivotally some way to another member at a trailing zone and is capable of moving that trailing pivot attachment substantially upwardly and downwardly usually against some resilience and/or damping arrangement. In motorcycle situations however the trailing pivot tends to be parallel to the in advance pivot. With the swinging arm envisaged for the present invention the pivot axis at the trailing extremity or region is substantially normal to that at the in advanced extremity such that there can be a measure of rotation thereby in turn to control disc angle relative to the advance direction.

Preferably the swinging arm and/or its arrangement are substantially as hereinafter described with reference to the accompanying drawings.

In another aspect the present invention consists in a seed sowing assembly (or components of such an assembly) of or for a seeder, the apparatus (being the components and/or the assembly) comprising or including a disc having an inside (preferably substantially concave) and outside (preferably substantially convex or complementary shaped if the disc is a pressed form), a hub or bearing ("bearing") attached to the disc from or so as to be substantially on the inside thereof and substantially on or about the centre of the disc, and a chute member or assembly (hereafter "mount") attached (by itself and/or other means) to the bearing from the outside of the disc, said mount preferably one or both having (a) the chute it at least in part defines having an inlet to receive seeds to be sown above an outlet from which they are to drop, and/or
  (b) a journalable seed inlet.

Preferably said mount is in turn attached or attachable to a trailing region of a swinging arm.

Preferably said swinging arm is able to raise and lower the disc and preferably means provides a bias on the swinging arm and thus through the mount and bearing into the disc to, (at least in use) provide a force to achieve ground penetration.

Preferably said mount and swinging arm are adjustable as to relative disposition so as to enable adjustment of the angular presentation of the disc to the advance direction and/or the swinging arm.

Preferably the swinging arm is mounted so as to pivot at its advance direction transversely of the advance direction.

Preferably the present invention consists in a seed drill having multiple seed sowing assemblies of the present invention in mirror imaged groupings for each transverse row or array.

As used herein a "row" is preferably a strict or substantial alignment transversely of the advance direction whilst reference to an "array" includes any grouping(s) that co-act to provide by in large a single or multiply faceted transverse mirrored arrangement. Other "arrays" however are within the scope of the term.

In a further aspect the present invention consists in a seed drill or seeder of a kind to deposit serial streams of seed each into a disc made trough, trench or the like in the ground characterised in that each disc has its bearing mounted to the disc from its inside (i.e. that side having a concavity) and the chute providing member or assembly down which the stream of seeds is to pass is attached to the bearing from the outside (i.e. the other side) of the disc.

Preferably said seeder or seed drill is further characterised in that the chute providing member is attachable in a range of angular dispositions to a swinging arm or is attached in a chosen or mandatory angular disposition to a swinging arm.

In still a further aspect the present invention involves banks of trailing arms, each trailing arm carrying a disc having some degree of concavity, a bearing or hub to allow disc rotation at least largely located within the concavity of the disc, and a mount from its swinging arm for the bearing or hub at least primarily from the other side of the disc.

Preferably said mount at least in part conforms to the shape of the disc.

Preferably said mount includes a seed deposition chute or at least part thereof.

Preferably said mount is journaled both into the bearing and into the swinging arm, the journal axes being at least substantially normal with respect to each other.

In a further aspect the present invention consists in a seed drill having, in (at least) two rows or arrays at least substantially transverse to its advance direction (whether by any of the means previously described), multiple seed deposition assemblies, the or more advanced array or row being out of alignment with the or a more trailing array or row, wherein each seed deposition assembly includes a concave disc, a bearing mounted to the disc on or from the concave side thereof and a mount into the bearing from the other disc side.

Preferably said mount into the bearing from the other side conforms at least in part to the convexity of the other side of the disc, the disc having been formed from a sheet material.

Preferably the mount is supported from a swinging arm.

Preferably said mount includes a tubular extension (preferably beyond the actual or projected circular periphery of the disc) which is journaled in a trailing region of a swinging arm, the swinging arm being adapted to pivot at a leading region thereof about a pivot axis normal to that to be provided between the mount and the swinging arm.

Preferably said swing arm includes a dog leg which in use will have its elbow or knee upwardly.

Preferably said swing arm is adapted or is engaged to a compression system adapted to allow some resilient rising of the disc and its bearing/mount on the swinging arm.

Preferably the tubular member journaled by the trailing region of the swing arm leads into a chute that in use will be at least at or slightly in advance of the rotational axis to be provided by the bearing and the mount interengagement.

Preferably a cover is provided for the chute.

Preferably the angular disposition of the mount relative to the swing arm is adjustable. That adjustment can be by means of rotation about the articulation axis to a desired condition and the retaining of that desired condition by the tightening of appropriate set screws, bolts, etc. Alternatively meshing features of each of the mount and the trailing region of the swing arm can be brought into a particular mesh and be held in that interengagement so as to hold alignment.

In a further aspect the present invention consists in a seed drill or seeder substantially as hereinafter described with reference to any one or more of the accompanying drawings.

In yet a further aspect the present invention consists in a kit for retrofitting or for fitment to a seeder or seed drill so as to provide arrangements substantially as herein described as being aspects of the present invention.

In still a further aspect the present invention consists in the use of apparatus in accordance with the present invention for the purpose of sowing seed.

In still a further aspect the present invention consists in a seeder having a hopper, conduits from the hopper (together with any singlulation or like arrangement) when adapted to feed through seed deposition assemblies of any of the kinds hereinbefore defined and/or hereinafter described.

In still a further aspect the present invention consists in turf produced by a sowing procedure reliant upon apparatus of any of the forms of the present invention.

In still a further aspect the present invention consists in sown ground sown using a seeder or seed drill in accordance with any aspect of the present invention.

BRIEF DESCRIPTION OF DRAWINGS

A preferred form of the present invention will now be described with reference to the accompanying drawings in which.

BEST MODE FOR CARRYING OUT THE INVENTION

Figure 4:
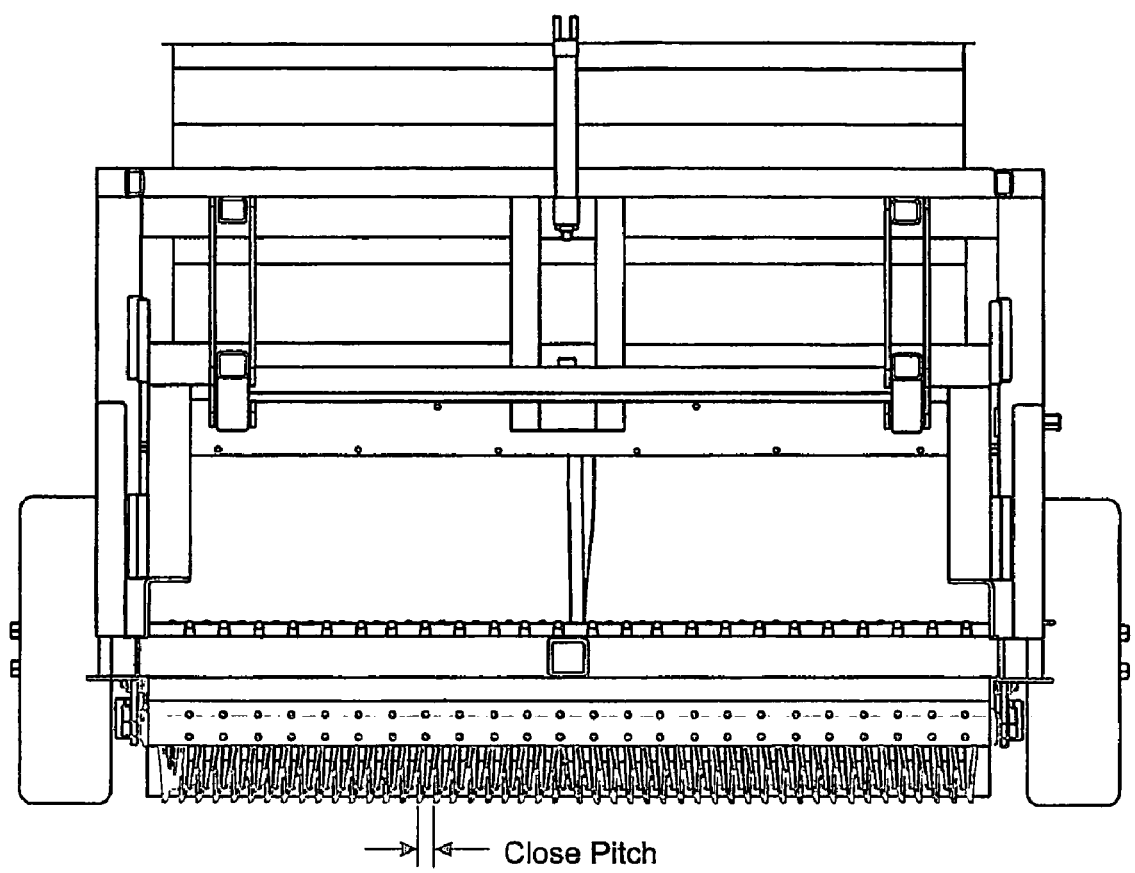
FIG. 4 shows the seeding apparatus of FIGS. 1 through 3 from the front.
Figure 5:
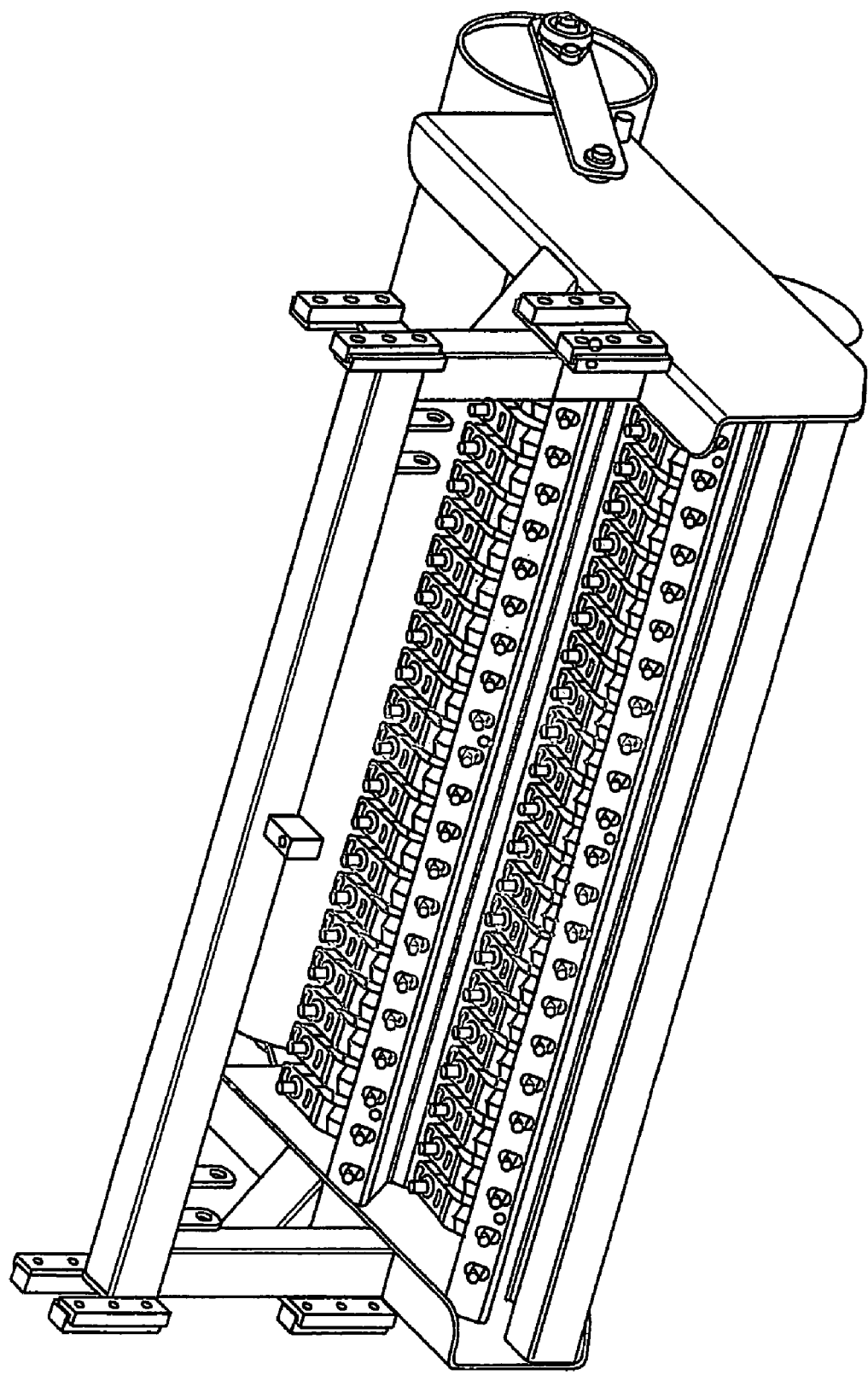
FIG. 5 shows in part the apparatus of FIGS. 1 through 4 from a front aspect in perspective or isometric.

In a preferred form of the present invention the seeding apparatus preferably carries each seed sowing disc and chute as part of an assembly preferably no wider than or substantially not wider than the width of a swinging arm when in plan. This allows the close pitch or centres as shown in FIG. 4, The present invention attempts to provide close centres between each disc and its seed deposition chutes so that close sowing is possible to provide a high quality turf.

Whilst the preferred invention will be described with reference to turf any appropriate seeding can utilise aspects of the present invention.

As shown the apparatus includes a draw bar 1 capable of drawing a chassis from which there is provided two ground wheels 2. Carried by the chassis is a seed hopper 3 having means 4 associated therewith to be rotated (by any drive desired) to carry paddles in the bottom of the hopper which in a known or other manner will provide for a serial streaming of seeds from the hopper 3 down through hosing or other tubing 5 thereby in use providing for each seed deposition assembly 6 its feed supply of seed.

Preferably the provision of seed is under gravity but pneumatic or other seed movement assist forms are still within the scope of the present invention.

Figure 6:
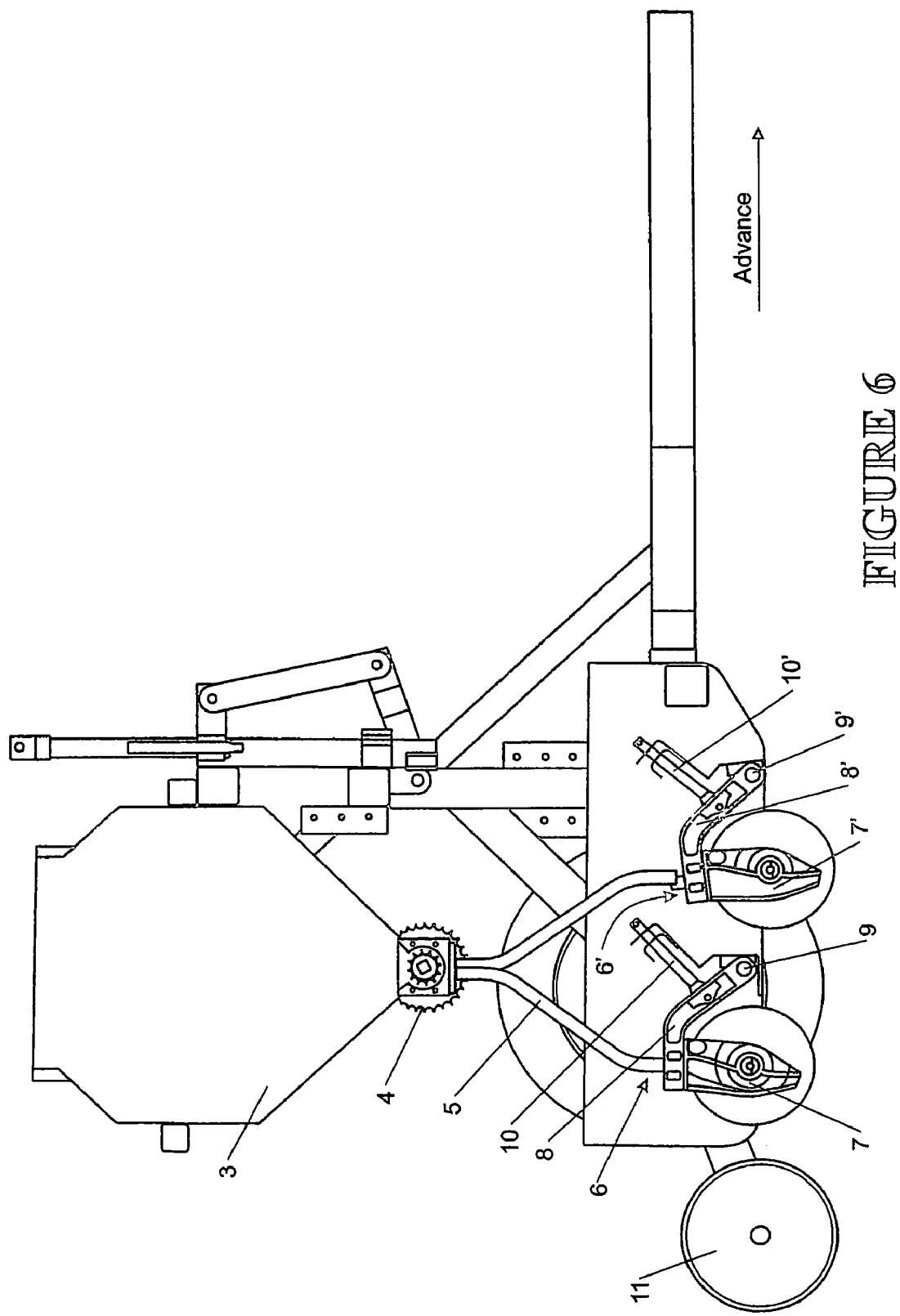
FIG. 6 shows apparatus of the present invention when viewed from its right hand side (with the advanced direction being to the right) showing diagrammatically a seed metering paddle which acts at the bottom of the seed hopper as a dispenser of individual seeds so that there is a serial streaming thereof down into each of the tubes to act as a seed guide down into the chute of the mount, and showing, as a sown trough, trench, or the like closure member, a suitable trailing roller.
Figure 7:
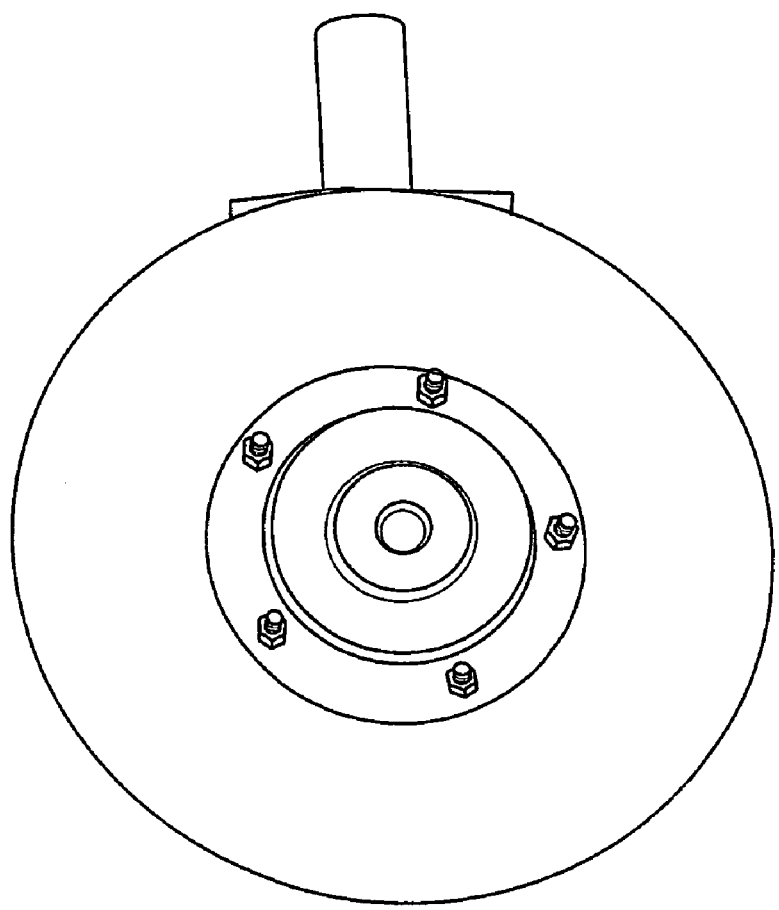
FIG. 7 shows a preferred disc in accordance with the present invention having its bearing centrally mounted (e.g.; by a fixing surround) and having received into that bearing from the far side (the non concave side) the mount with its journalable tubular portion outwardly of the disc periphery, the mounting into the bearing (for example, a roller bearing) being by any appropriate means including, for example, the nut and bolt engagement (see FIG. 9)
Figure 8:
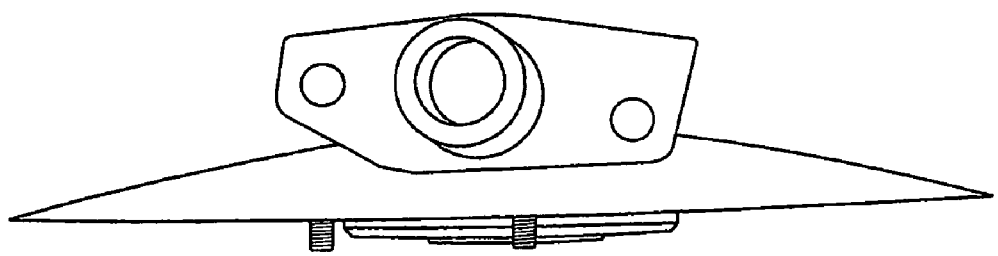
FIG. 8 shows from above the arrangement of FIG. 7.
Figure 9:
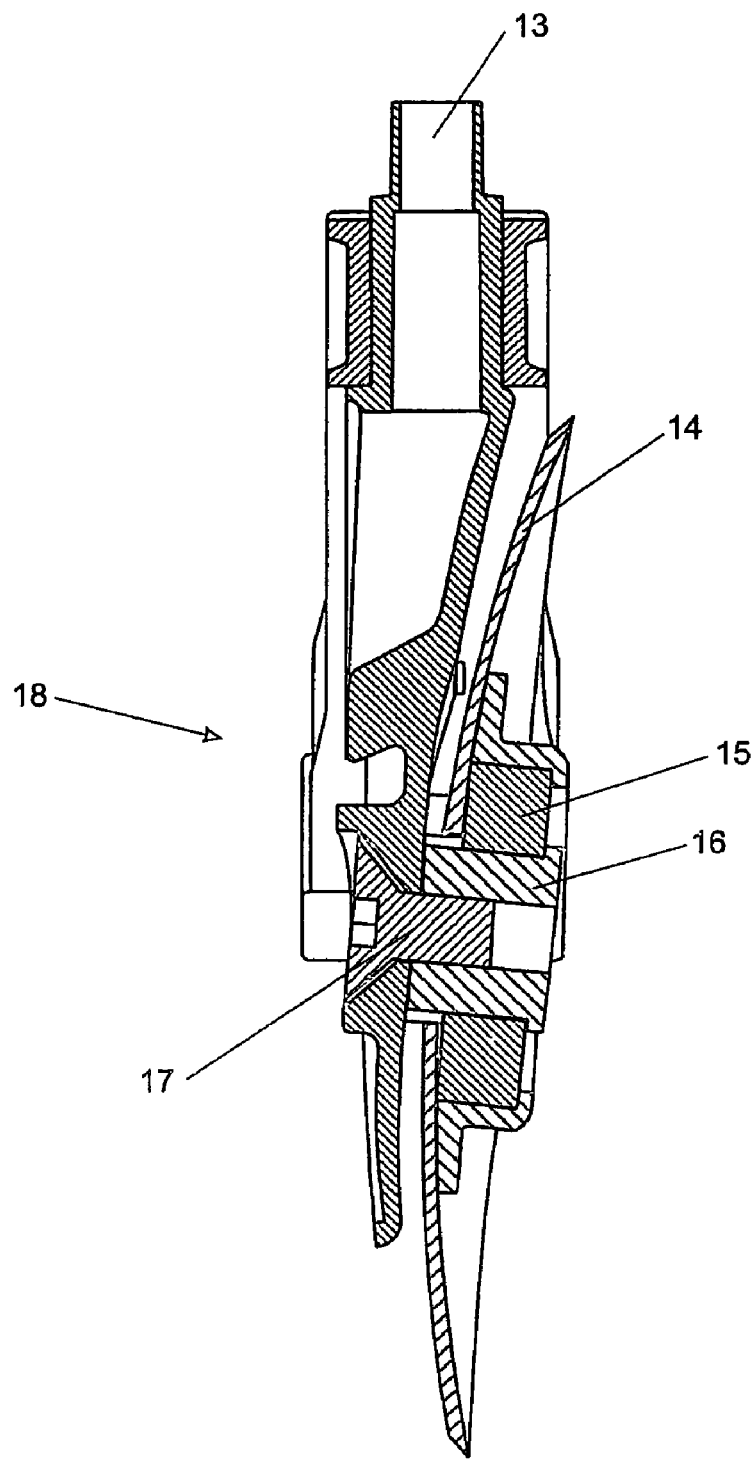
FIG. 9 is a cross section of the apparatus of FIGS. 7 and 8.
Figure 10:
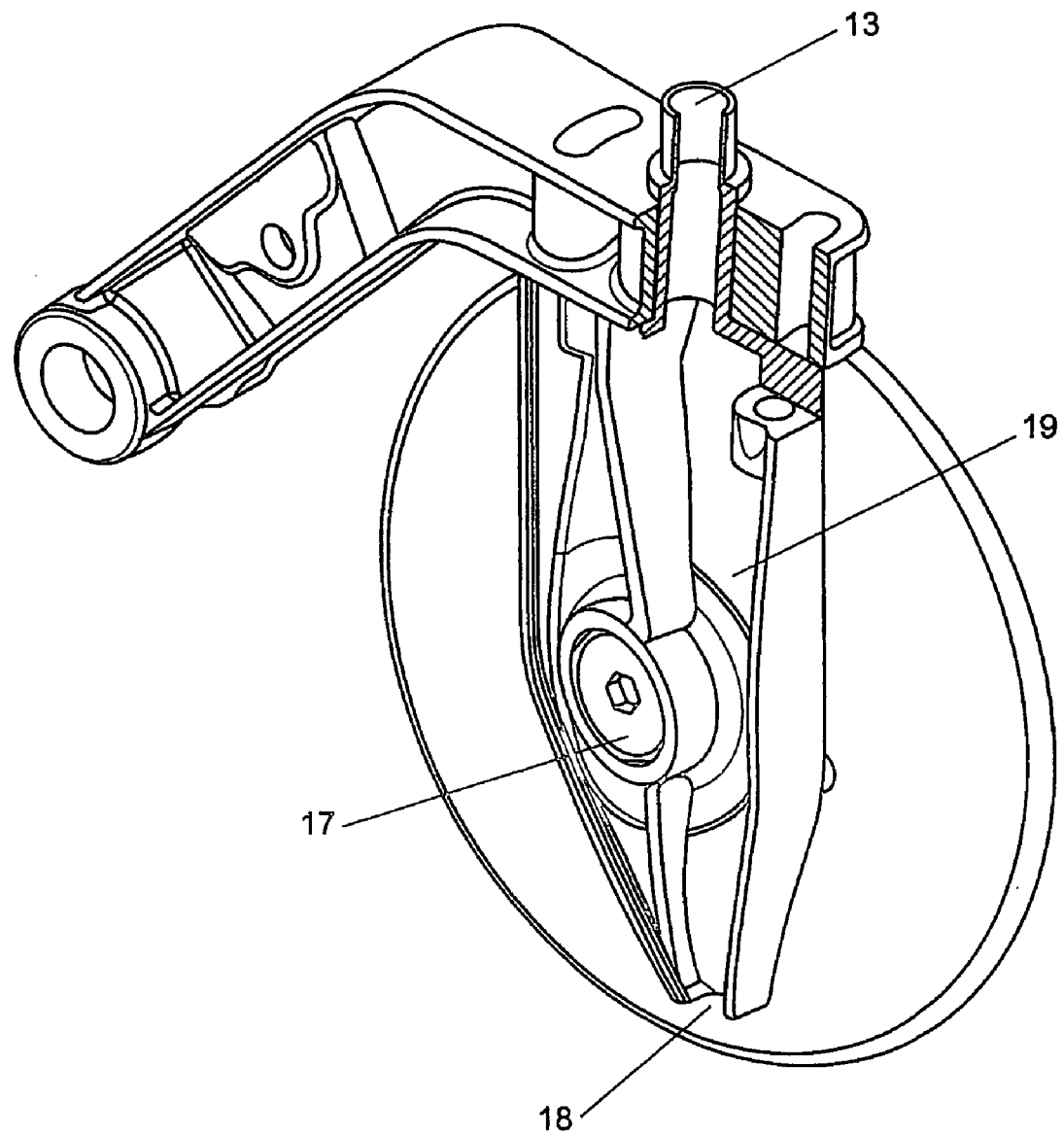
FIG. 10 shows a swinging arm journaling a moulding at least in part defining the mount which itself or with associated parts engages with the bearing.

It can be seen from FIG. 6 that there are two rows of seed deposition assemblies 6 with that labelled (6' being in advance of that simply labelled 6). Each assembly of a mount 7 and 7' is mounted from its swinging arm 8, 8' respectively in turn pivoted on axis 9 and 9' respectively from the chassis of the apparatus.

Each swinging arm 8/8' can swing upwardly and downwardly so as to compress a spring held captive by the guide rod 10/10'.

Figure 1:
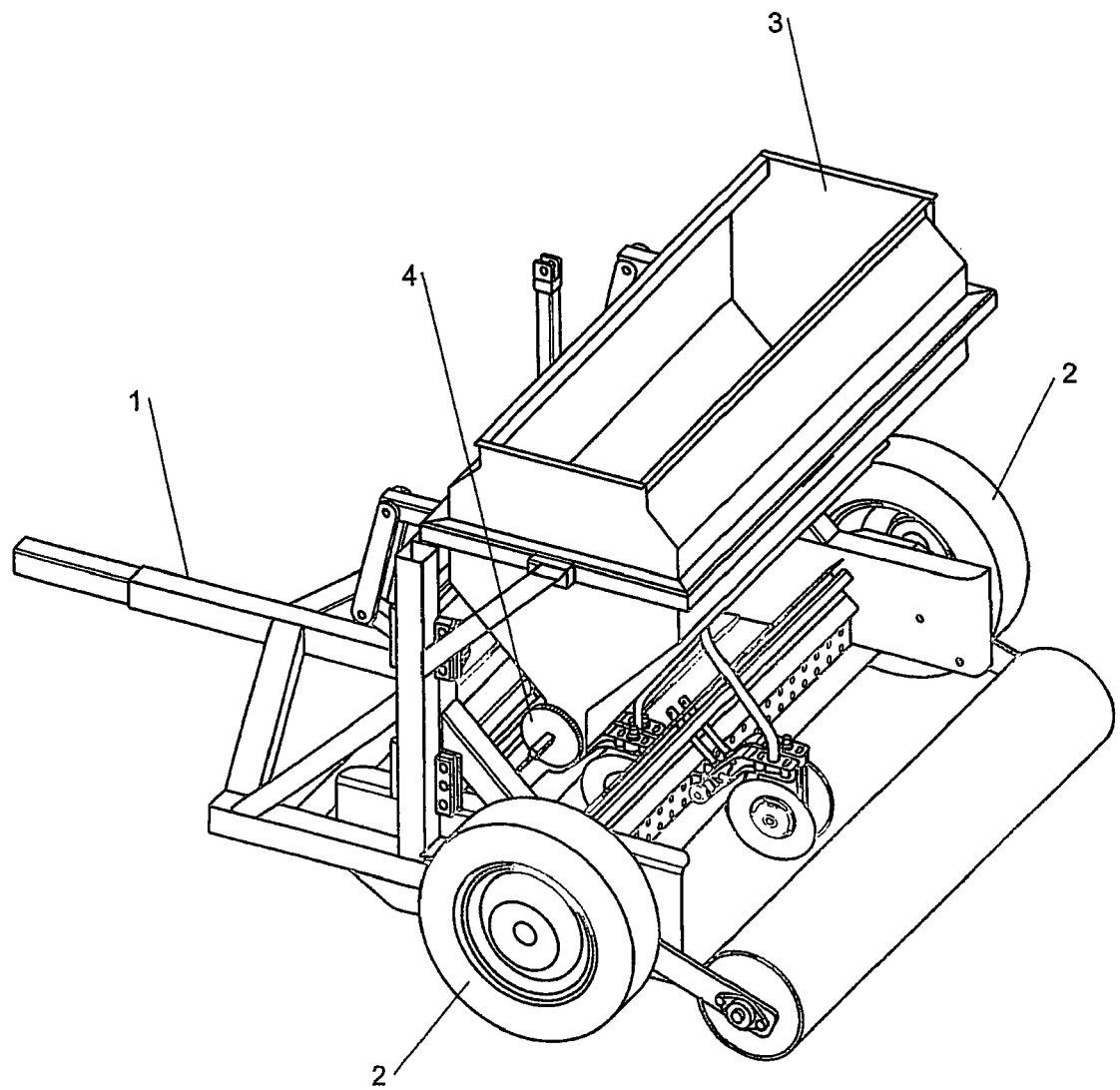
FIG. 1 shows for clarity purposes part of an overall ground wheel supported seeder capable of being drawn behind a vehicle such as a tractor, the drawing showing a hopper and a roller and showing two pairs of the most central discs of each row, each mounted opposite to the other so as to avoid any sideways pull on the apparatus in use, the central pairing in advance of the trailing pairing of discs being offset so as to sow between the lines of seed being sown by the rear most seed sowing assemblies.
Figure 2:
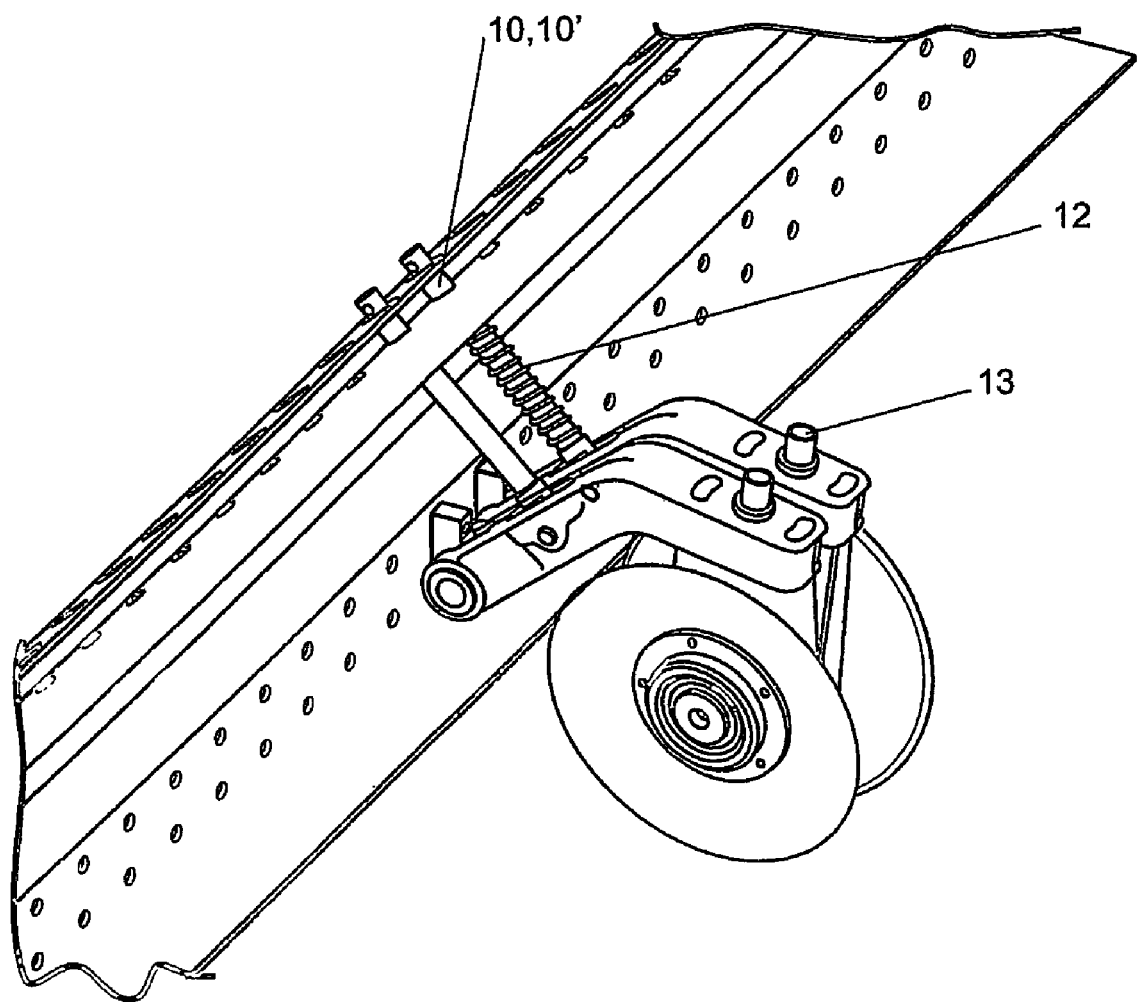
FIG. 2 is a close-up of the trailing pairing or the advanced pairing shown in FIG. 1, showing for one of the two trailing arms (it would be both in fact) a compression spring held captive on a captive movement limiter (e.g.; a retained rod) which can be relied upon by means (not shown) for the raising or lowering of the discs out of ground contact but which in the condition as shown, or indeed even more downwardly therefrom, will have the effect of achieving ground penetration.
Figure 3:
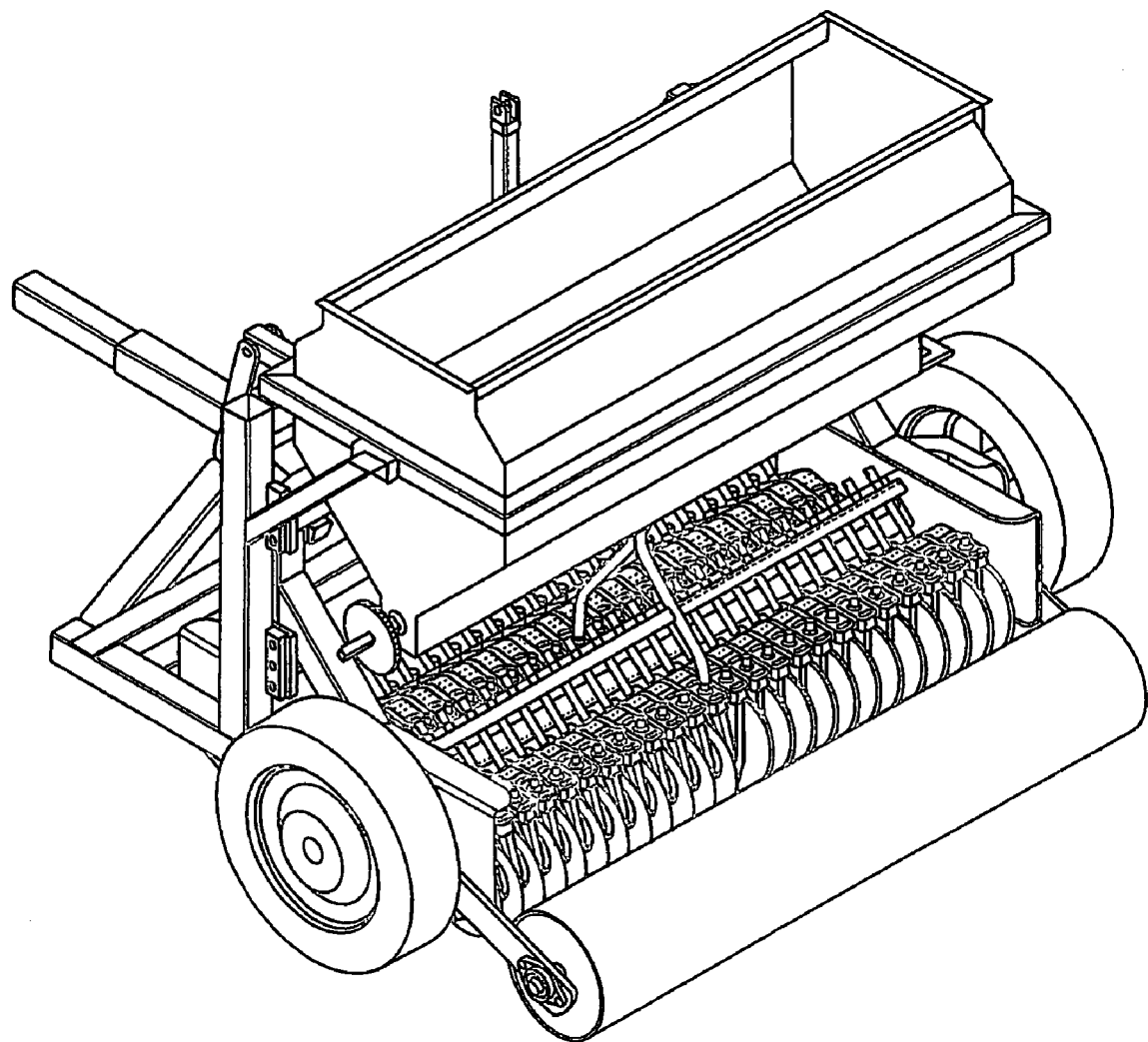
FIG. 3 is a similar view to that of FIG. 1 but showing all of the discs appropriately positioned but showing only a couple of the disc mounts having a conduit (e.g.; of hose or other flexible means) interconnecting from the singlulator or other seed dispenser that operates in the bottom of the hopper shown.

As shown a roller 11 trails the row or arrays of seed deposition assemblies. The spring on a rod 10 or 10' is best shown as 12 in FIG. 2 as also can the entrance 13 of a chute.

Figure 11:
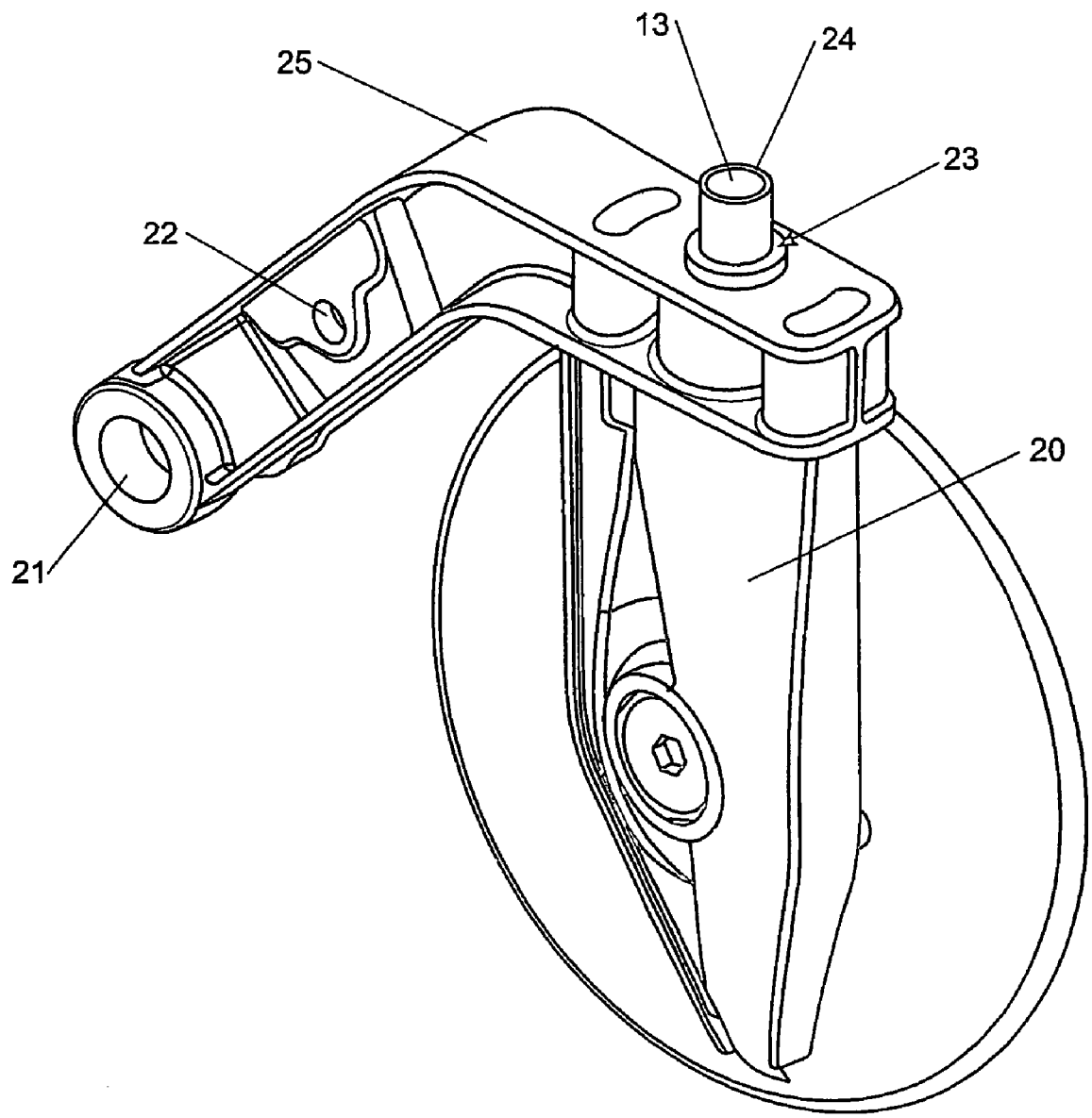
FIG. 11 is a similar view to that of FIG. 10 but showing a cover for the seed chute from the entrance to its lower exit.

An important aspect of the present invention is the ability to close centre each seed deposition assembly by virtue of the disc 14 having its bearing 15 mounted at and/or about the centre of the disc largely within its concavity (and preferably primarily from that side) so as to enable in conjunction with that bearing members 16 and 17 (e.g.; a nut and bolt or vice versa) to act as the final mount thereof with a majority of the (preferably moulded) mount 18 being that moulded member depicted in the drawings and including the seed entry through a passageway having an exit 18. Such a chute 19 is capable of being closed by a cover plate 20 as shown in FIG. 11.

The swinging arm with its raised dog leg, knee or elbow has its advance end provided with an axle receiving opening 21 to provide the axis 9 referred to with respect to FIG. 6, an opening 22 to allow engagement of a rod 10 or 10' therewith and an opening at 23 to journal the entrance sleeve region 24 of the moulding.

The upwardly raised knee or elbow is shown as 25.

In the arrays shown there are groupings that are the same on either side of the centre line of the apparatus such that there is no net pull one way or the other. Whilst as depicted it is clear that the apparatus is shown with the concavity outwardly on either side of the centre of the overall apparatus, this is not mandatory. Nor is it mandatory for the same arrangement to be used for both the advanced and trailing rows.

Figure 12A:
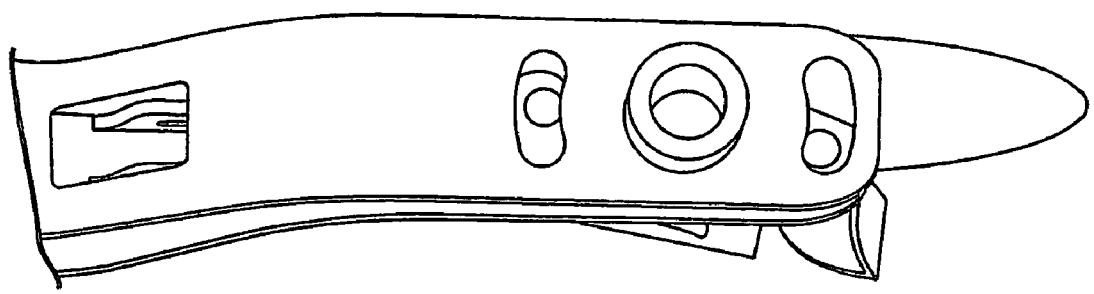
FIGS. 12A and 12B show from above how each swinging arm which preferably is to be trailed exactly in alignment with the normal advance direction can have the disc angled differently with respect thereto so as to achieve different cut types, the other discs of each row or array or part array being in alignment therewith.
Figure 12B:
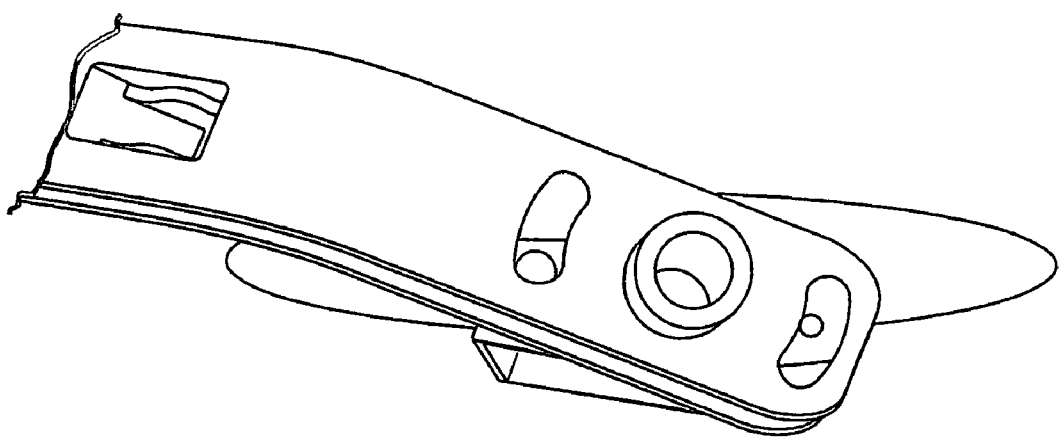

Any appropriate angle control as aforesaid can both provide for the hanging support of the mount 18 from the swinging arm and its angling relative to the swinging arm. The arrangement of FIGS. 12A and 12B has provision for set screw control of both functions.

The invention claimed is:

1. Seeding apparatus to be advanced over the ground while depositing a stream of seed from each of a plurality of ground opening and seed depositing assemblies, said apparatus comprising
 an advanceable support,
 ground opening and seed depositing assemblies arrayed on said advanceable support in one or more at least substantially transversely extending banks with respect to an advancement locus,
 each said ground opening and seed depositing assembly including
  a swinging arm from said advanceable support,
  a ground opening disc having concave and convex sides,
  a bearing assembly for the disc, said bearing assembly being located in a concavity of the concave side,
  a mounting member extending from a trailing part of the swing arm and conforming over part of the convex side of the disc and connecting to said bearing assembly, and
  a seed deposition tube at least as part of, or carried by, said mounting member to receive and deposit seed adjacent the convex side of the disc into a trough opened by the disc, said seed disposition tube being contoured to a convexity of the convex side of the disc and being attached to the bearing assembly so as to minimize space between adjacent ground opening and seed depositing assemblies.

2. The seeding apparatus of claim 1, wherein said swinging arm raises and lowers the disc.

3. The seeding apparatus of claim 1, wherein the swinging arm is mounted so as to pivot transversely of the advancement locus.

4. The apparatus of claim 1, wherein an angular disposition of the mounting member relative to the swinging arm is adjustable.

\* \* \* \* \*